(12) United States Patent
Marupaduga

(10) Patent No.: US 12,267,812 B2
(45) Date of Patent: *Apr. 1, 2025

(54) DYNAMICALLY REASSIGNING A HIGH-NOISE FREQUENCY SEGMENT FROM A FIRST ACCESS NODE TO A SECOND ACCESS NODE

(71) Applicant: T-Mobile USA, Inc., Bellevue, WA (US)

(72) Inventor: Sreekar Marupaduga, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/354,417

(22) Filed: Jul. 18, 2023

(65) Prior Publication Data

US 2023/0413237 A1    Dec. 21, 2023

Related U.S. Application Data

(63) Continuation of application No. 17/305,969, filed on Jul. 19, 2021, now Pat. No. 11,751,170.

(51) Int. Cl.
*H04W 72/04* (2023.01)
*H04L 1/00* (2006.01)
(Continued)

(52) U.S. Cl.
CPC ....... *H04W 72/02* (2013.01); *H04W 72/0453* (2013.01); *H04W 72/52* (2023.01); *H04W 72/541* (2023.01); *H04W 92/10* (2013.01)

(58) Field of Classification Search
None
See application file for complete search history.

(56) References Cited

U.S. PATENT DOCUMENTS 10,075,851 B1   11/2018   Marupaduga et al.
10,660,095 B1    5/2020   Marupaduga et al.
(Continued)

OTHER PUBLICATIONS

MediaTek, "5G NR and 4G LTE Coexistence, A Comprehensive Deployment Guide to Dynamic Spectrum Sharing," White Paper, 2020.

(Continued)

*Primary Examiner* — Sai Aung
(74) *Attorney, Agent, or Firm* — Lee & Hayes, P.C.

(57) ABSTRACT

A method and system to dynamically reassign RF spectrum from a first access node to a second access node, where the first access node provides service on a first carrier having a carrier bandwidth. An example method includes (i) selecting a frequency portion of the carrier bandwidth to reassign, the selecting being based on the frequency portion having higher determined noise than one or more other frequency portions of the carrier bandwidth, and (ii) based on the selecting, reassigning the selected frequency portion from the first access node to the second access node to be used by the second access node as at least part of a second carrier on which to provide service. Upon reassigning of the selected frequency portion, the second access node could then provide service on the reassigned portion and the first access node could continue to provide service on a remainder of the first carrier.

17 Claims, 4 Drawing Sheets

(51) Int. Cl.
*H04W 16/14* (2009.01)
*H04W 72/02* (2009.01)
*H04W 72/0453* (2023.01)
*H04W 72/52* (2023.01)
*H04W 72/541* (2023.01)
*H04W 92/10* (2009.01)

(56) References Cited

U.S. PATENT DOCUMENTS

| | | | |
|---|---|---|---|
| 10,798,719 B2 | 10/2020 | Beale et al. | |
| 2002/0128014 A1* | 9/2002 | Chen | H04W 16/10 455/450 |
| 2004/0097240 A1 | 5/2004 | Chen et al. | |
| 2006/0203724 A1* | 9/2006 | Ghosh | H04W 52/42 370/328 |
| 2007/0165569 A1 | 7/2007 | Kaminski et al. | |
| 2007/0195897 A1 | 8/2007 | Cheng et al. | |
| 2007/0195899 A1* | 8/2007 | Bhushan | H04B 7/0452 370/310 |
| 2009/0154588 A1 | 6/2009 | Chen et al. | |
| 2009/0238123 A1 | 9/2009 | Kuri et al. | |
| 2009/0296835 A1 | 12/2009 | Hidaka | |
| 2010/0056140 A1 | 3/2010 | Hafeez | |
| 2013/0201834 A1 | 8/2013 | Klingenbrunn et al. | |
| 2014/0286170 A1 | 9/2014 | Ericson et al. | |
| 2015/0023314 A1* | 1/2015 | Thubert | H04W 72/02 370/330 |
| 2015/0327080 A1 | 11/2015 | Claussen et al. | |
| 2015/0334599 A1 | 11/2015 | Maaref et al. | |
| 2015/0373571 A1 | 12/2015 | Chincholi et al. | |
| 2016/0021647 A1 | 1/2016 | Hui et al. | |
| 2016/0226534 A1* | 8/2016 | Suzuki | H04B 1/10 |
| 2020/0077437 A1 | 3/2020 | Stern-Berkowitz et al. | |
| 2021/0185585 A1 | 6/2021 | Chen et al. | |
| 2021/0307010 A1* | 9/2021 | Abotabl | H04L 5/14 |
| 2021/0391963 A1 | 12/2021 | Abdelghaffar et al. | |
| 2022/0038230 A1* | 2/2022 | Tsui | H04W 72/23 |
| 2022/0312383 A1* | 9/2022 | Ly | H04B 1/713 |
| 2022/0360361 A1* | 11/2022 | Saggar | H04W 72/12 |
| 2022/0360387 A1* | 11/2022 | Bai | H04L 5/0051 |

OTHER PUBLICATIONS

International Search Report and Written Opinion from International Application No. PCT/US22/73723, dated Oct. 6, 2022.

* cited by examiner

DYNAMICALLY REASSIGNING A HIGH-NOISE FREQUENCY SEGMENT FROM A FIRST ACCESS NODE TO A SECOND ACCESS NODE

REFERENCE TO RELATED APPLICATION

This is a continuation of U.S. patent application Ser. No. 17/305,969, filed Jul. 19, 2021 the entirety of which is hereby incorporated by reference.

BACKGROUND

A typical wireless communication system includes a number of access nodes that are configured to provide wireless coverage areas, referred to as cells, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the system could engage in air interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each cell could operate on a radio-frequency (RF) carrier, which could be frequency division duplex (FDD), defining separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth and a center frequency and thus extending from a low-end frequency to a high-end frequency.

Each carrier could be defined within an industry standard frequency band, by its frequency channel(s) being defined within the frequency band. Examples of such frequency bands include (i) bands 2, 4, 12, 25, 26, 66, 71, and 85, supporting FDD carriers (ii) band 41, supporting TDD carriers, and (iii) bands n258, n260, and n261, supporting FDD and TDD carriers, among numerous other possibilities.

Further, each cell could have a physical cell identity (PCI) or the like that identifies the cell on the carrier, to help distinguish adjacent or otherwise nearby cells that operate on the same carrier as each other. Accordingly, each cell could be characterized by a respective combination of its carrier and its PCI.

On the downlink and uplink, the air interface of each cell could be configured in a specific manner to define physical resources for carrying information (e.g., user-plane data and control-plane signaling) wirelessly between the access node and UEs.

In a non-limiting example implementation, for instance, the air interface of each cell could be divided over time into frames, subframes, and symbol time segments, and over frequency into subcarriers that could be modulated to carry data. The example air interface could thus define an array of time-frequency resource elements, with each resource element spanning a respective symbol time segment and occupying a respective subcarrier, and the subcarrier of each resource element could be modulated to carry information.

In addition, certain groups of these resource elements on the downlink and uplink of the example air interface could then be designated for special use.

For instance, on the downlink, certain resource elements per subframe could be generally reserved to define a physical downlink control channel (PDCCH) for carrying control signaling such as scheduling directives from the access node to served UEs, and other resource elements per subframe could be generally reserved to define a physical downlink shared channel (PDSCH) in which the resource elements could be grouped to define physical resource blocks (PRBs) that could be allocated on an as needed basis to carry data communication from the access node to UEs.

Further, among these generally reserved downlink resources, certain resource elements could be excluded from the PDCCH and PDSCH and reserved for other use. For instance, in LTE, (i) certain resource elements per frame could be reserved to provide primary and secondary synchronization signals (PSS and SSS) that UEs could detect as an indication of carrier presence and to establish frame timing, (ii) other resource elements per frame could be reserved to provide physical broadcast channel (PBCH) messaging, including a master information block (MIB) and various system information blocks (SIBs), that UEs could read to determine carrier bandwidth and other carrier and system information, and (iii) other resource elements per frame could be reserved to provide a cell specific reference signal (CRS) that UEs could measure as a basis to gauge coverage strength on the carrier. And in NR, certain resource elements per frame could be reserved to define a synchronization signal block (SSB) that carries PSS, SSS, and PBCH of the NR carrier and that UEs can also measure to gauge coverage strength.

And likewise, on the uplink, certain resource elements could be reserved to define an uplink control channel (PUCCH), and other resource elements between could be generally reserved to define a physical uplink shared channel (PUSCH) in which the resource elements could be grouped to define PRBs that could be allocated on an as needed basis to carry data communications from UEs to the access node. And within these generally reserved ranges, certain resource elements could similarly be excluded from the PUCCH and PUSCH and reserved for other use, such as to carry uplink reference signals and random-access messaging, among other possibilities. OVERVIEW In example operation, when a UE enters into coverage of such a network, the UE could initially scan for and detect threshold strong coverage of a cell provided by an access node. And the UE could then engage in random-access and connection signaling, such as Radio Resource Control (RRC) signaling, with the access node to establish an air-interface connection (e.g., RRC connection) through which the access node will then serve the UE in the cell.

Further, if the UE is not already registered for service with the core network, the UE could transmit to the access node an attach request, which the access node could forward to a core-network controller for processing. And the core-network controller and access node could then responsively coordinate setup for the UE of one or more user-plane bearers, each including an access-bearer that extends between the access node and a core-network gateway system providing connectivity with a transport network, and a data-radio-bearer (DRB) that extends over the air between the access node and the UE.

Once the UE is so connected and registered, the access node could then serve the UE in a connected mode over the established air-interface connection, coordinating downlink air-interface communication of packet data to the UE and uplink air-interface communication of packet data from the UE.

With the example air interface described above, for instance, when packet data for the UE arrives at the core network from a transport network, the data could flow to the UE's serving access node, and the access node could then allocate one or more downlink PRBs to carry the data to the UE and could transmit to the UE a scheduling directive designating the allocated PRBs, and the access node could then accordingly transmit the data to the UE in the allocated PRBs. Likewise, when the UE has data to transmit on the transport network, the UE could transmit a scheduling request to the access node, the access node could responsively allocate one or more uplink PRBs to carry the data from the UE and could transmit to the UE a scheduling directive designating the allocated PRBs, and the UE could then accordingly transmit the data to the access node in the allocated PRBs.

As the industry advances from one RAT to another, wireless operators may face challenges regarding RF spectrum allocation. Without limitation, this is particularly the case with the advance from 4G LTE to 5G NR. Although 5G NR coverage is commonly provided at higher frequencies with greater bandwidth, those higher frequencies also suffer from higher path loss and associated reduced coverage area. Therefore, wireless operators may desire to implement 5G NR at lower frequencies. But the lower frequencies tend to be used for 4G LTE service. Further, operators may have limited licensed RF spectrum.

One solution to this problem could be for a wireless operator to statically reassign some of its licensed RF spectrum from 4G LTE use to 5G NR use. For instance, if the operator had devoted spectrum in a given band to 4G LTE service, the operator could statically reassign one or more carriers in that band to be used for 5G NR service instead. Unfortunately, however, this static reassignment of spectrum could pose problems for 4G LTE-only UEs, possibly limiting their available throughput.

An improved solution may be dynamic spectrum sharing (DSS). With DSS, the operator could dynamically allocate some of its RF spectrum from 4G LTE use to 5G NR use, perhaps increasing the allocation as 5G NR device penetration increases. For instance, as to a given 4G LTE carrier, the operator could dynamically assign certain subframes and/or ranges of PRBs of the carrier for 5G NR use. An operator could usefully implement DSS where the operator would provide overlapping 4G LTE and 5G NR coverage, such as with collocated 4G LTE and 5G NR access nodes that radiate in largely the same direction as each other, among other possibilities.

An example DSS implementation with 4G LTE and 5G NR, a 4G LTE access node (4G evolved Node-B (eNB)), and/or an associated computing system, could manage spectrum reassignment to a 5G NR access node (5G next-generation Node-B (gNB)). In particular, the 4G eNB could be configured by default to provide 4G LTE service on a particular carrier that has an associated carrier bandwidth and structure as noted above for instance. And the 4G eNB could dynamically reassign a portion of that carrier to the 5G gNB for use by the 5G gNB to provide 5G NR service. For instance, the 4G eNB could reassign a specific range of PRBs of the carrier, perhaps in specific subframes, to the 5G gNB for use as a 5G NR carrier. Further, the 4G eNB could dynamically this spectrum allocation periodically, such as on a per frame or per subframe basis, among other possibilities.

This DSS implementation could enable UEs that support both 4G LTE and 5G NR service to make good use of the dynamically defined 5G NR carrier. In practice, for instance, when the 4G eNB dynamically reassigns the spectrum to define the 5G NR carrier, the 4G eNB could inform such dual-RAT UEs that the 5G NR carrier exists. By way of example, the 4G eNB could broadcast in a 4G LTE SIB message an indication of the time and frequency position of the SSB that the 5G gNB will broadcast on the 5G NR carrier, or the 4G eNB could directly report that SSB position to the 4G eNB's served UEs that are 5G NR capable. Each such UE could then read the SSB to determine configuration of the dynamically defined 5G NR carrier and could then work to acquire connectivity with the 5G gNB on that 5G NR carrier.

A technological issue that can arise with such DSS implementations, however, is that the 4G eNB may end up reassigning for 5G NR use some relatively high-quality RF spectrum of the carrier, thus removing that relatively high-quality RF spectrum from availability for use to serve 4G LTE-only UEs. The quality level at issue here could relate to the level of noise present on the carrier. Across its bandwidth, a carrier may have varying levels of noise. Portions of the carrier, such as particular PRBs, that have higher level of noise than other portions of the carrier, may pose greater issues with air-interface communication, thus limiting throughput.

If the 4G eNB reassigns for 5G NR use some relatively high-quality RF spectrum of the carrier, e.g., a range of PRBs having relatively low levels of noise compared with other PRBs of the carrier, that may leave the lower-quality (e.g., higher noise) portions of the carrier for use to serve 4G LTE-only UEs. And that may result in the 4G LTE-only UEs suffering from possibly reduced throughput than they could have attained with service on the higher-quality portions of the carrier.

The present disclosure provides a mechanism to help address this technical issue.

In accordance with the disclosure, when a first access node (e.g., a 4G eNB) is going to dynamically reassign a frequency portion of a carrier for use by a second access node (e.g., a 5G gNB), the first access node will select the frequency portion based on the frequency portion having a relatively high level of noise compared with one or more other frequency portions of the carrier.

For instance, if the carrier defines a plurality N of PRBs and the first access node will dynamically reassign a quantity Q of those PRBs for use by the second access node, the first access node could determine the level of noise respectively of each of various candidate sets of Q of the PRBs, and the first access node could select a set based on the set having the highest determined level of noise among the candidate set or based on the set having a higher determined level of noise than one or more other sets of the candidate sets. And based on that selection, the first access node could then dynamically reassign a frequency portion defined by that selected set of Q of the PRBs for use by the second access node.

Optimally, by selectively reassigning for use by the second access node the set of Q of the PRBs having the highest determined level of noise or having higher determined noise than another candidate set, the first access node can help to retain higher quality PRBs of the carrier for use to serve UEs itself, perhaps to serve UEs that are capable of being served by the first access node and are not capable of being served by the second access node.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of a system supporting both 4G LTE and 5G NR as noted above. But it should be understood that the disclosed principles could extend to apply in other scenarios as well, such as with other RATs, and with other network configurations, among other possibilities.

Further, it should be understood that other changes from the specific arrangements and processes described are possible. For instance, various described entities, connections, operations, and other elements could be added, omitted, distributed, re-located, re-ordered, combined, or changed in other ways. In addition, various operations described as being performed by one or more entities could be implemented in various ways, such as by a processing unit executing instructions stored in non-transitory data storage, along with associated circuitry or other hardware, among other possibilities.

Figure 1:
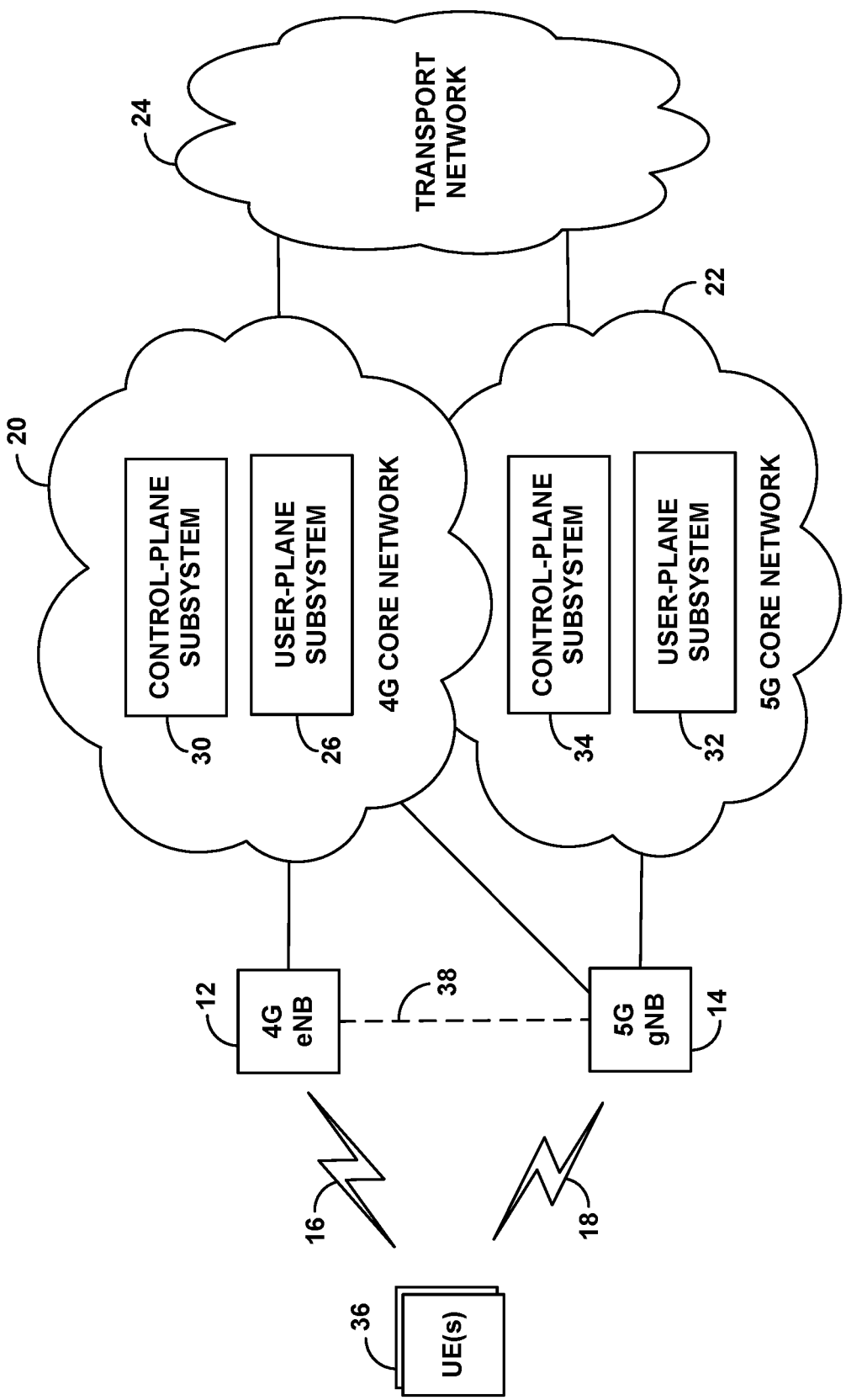
FIG. 1 is a simplified block diagram of an example network arrangement in which features of the present disclosure can be implemented.

Referring to the drawings, FIG. 1 is a simplified block diagram of an example network arrangement having a 4G eNB 12 and a 5G gNB 14. These access nodes could be macro access nodes of the type configured to provide a wide range of coverage or could take other forms, such as small cell access nodes, relays, femtocell access nodes, or the like, possibly configured to provide a smaller range of coverage, and the access nodes could take different forms than each other. Further, the access nodes could be collocated with each other, e.g., at a common cell site with collocated RF points of origin, or could be separately located. Either way, the access nodes could be optimally configured to provide spatially overlapping coverage.

In the example illustrated, the 4G eNB 12 is configured to provide 4G coverage and service on one or more 4G carriers 16, and the 5G gNB 14 is configured to provide 5G coverage and service on one or more 5G carriers 18, at least one of which may be dynamically defined per the present disclosure.

To facilitate providing service and coverage on the illustrated carriers, the access nodes could each have a respective antenna structures, such as an antenna array, that is configured to transmit and receive electromagnetic signals in a region defined by an antenna pattern or radiation pattern, or the access nodes could share portions of a common antenna array for this purpose. Further, the access nodes could include other communication equipment, such as baseband units, radio heads, power amplifiers, and the like.

The air interface on each of these carriers could be structured as described above by way of example, being divided over time into frames, subframes, and symbol time segments, and over frequency into subcarriers, thus defining an array of air-interface resource elements grouped into PRBs allocable by the respective access node as noted above, for use to carry data to or from served UEs. Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

As further shown in FIG. 1, the example arrangement includes two core networks, designated as a 4G core network 20 and a 5G core network 22, each providing connectivity with an external transport network 24 such as the Internet for instance.

Each of these core networks could be a packet-switched network supporting virtual-packet tunnels or other interface between network nodes. And each core network could include both a user-plane subsystem through which UE bearer communications could flow to and from the transport network 24, and a control-plane subsystem supporting functions such as UE authentication, mobility management, and bearer management, among others. In particular, the 4G core network 20 is shown including a user-plane subsystem 26 and a control-plane subsystem 28, and the 5G core network 22 is shown including a user-plane subsystem 30 and a control-plane subsystem 32. The 4G and 5G core networks, however, may differ from each in various ways, with the 5G core network offering certain advantages. For instance, the 5G core network 22 may provide greater separation of control-plane and user-plane functions and may facilitate advanced slicing or other options that offer improved quality of service and other benefits compared with the 4G core network 20.

In the example arrangement shown, the 4G eNB 12 is interfaced with the 4G core network 20, so that UEs served by the 4G eNB 12 may be served in turn by the 4G core network 20, and the 5G gNB 14 is interfaced with the 5G core network 22, so that UEs served by the 5G gNB 14 may be served in turn by the 5G core network 22. Further, the 5G gNB 14 may also be interfaced with the 4G core network 20 as shown, to support 4G-5G dual connectivity where a UE is served concurrently by both the 4G eNB 12 and the 5G gNB 14, and in turn by the 4G core network 20. In addition, as shown, the 4G eNB 12 and 5G gNB 14 could have a communication interface (e.g., an X2 interface or Xn interface) 38 with each other.

FIG. 1 illustrates a number of example UEs 36 that may from time to time be within coverage of both the 4G eNB 12 and the 5G gNB 14. Each such UE could take any of the forms noted above among other possibilities. Further, some such UEs may be 4G-only in that the UEs support 4G LTE service but not 5G NR service, whereas other such UEs may support 5G NR service, perhaps being backwards compatible to support 4G LTE service as well, and perhaps supporting DSS as described herein. To facilitate 4G LTE service, a UE could include a 4G LTE radio and associated circuitry. And to facilitate 5G NR service, a UE could include a 5G NR ratio and associated circuitry.

In an example implementation, when the UE is within coverage of this system, the UE may acquire connectivity with either the 4G eNB 12 or the 5G gNB 14. The choice of which access node the UE would connect with could depend on various factors, such whether the UE is set to prefer one RAT over the other and/or which access node provides stronger coverage, among other possibilities.

If the UE discovers threshold strong coverage of the 4G eNB 12 on a 4G carrier 16 and decides to connect with the 4G eNB 12, the UE may then responsibly engage in random access and RRC signaling with the 4G eNB 12 to establish a 4G connection between the UE and the 4G eNB 12 on that 4G carrier 16. And once the UE is connected with the 4G eNB 12, the UE could then transmit to the 4G eNB 12 an attach or registration message, which the 4G eNB 12 could forward to the control-plane subsystem 30 of the 4G core network 20 for processing. Upon authenticating and authorizing the UE for service, the control-plane subsystem 30 and the 4G eNB 12 could coordinate setup for the UE of at least one user-plane bearer through the user-plane subsystem 26 of the 4G core network 20, enabling the UE to communicate on transport network 24.

Once the UE is connected with the 4G eNB 12 and registered with the 4G core network 20, the 4G eNB 12 could then provide the UE with wireless packet-data communications as noted above. For instance, when the user-plane subsystem 26 of the 4G core network 20 receives data from the transport network 24 for transmission to the UE, that data could flow via the UE's bearer to the 4G eNB 12, and the 4G eNB 12 could coordinate transmission of that data from the 4G eNB 12 to the UE on downlink PRBs of the 4G carrier 16 of the UE's 4G connection. And when the UE has data for transmission on the transport network 24, the UE could transmit a scheduling request to the 4G eNB 12, the 4G eNB 12 could coordinate transmission of that data from the UE to the 4G eNB 12 on uplink PRBs of the 4G carrier 16, and the data could then flow via the UE's access bearer through the user-plane subsystem 26 of the 4G core network 20, for output on the transport network 24.

Whereas, if the UE discovers threshold strong coverage of the 5G gNB 14 on a 5G carrier 18 and decides to connect with the 5G gNB 14, then the UE may responsively engage in random access and RRC signaling with the 5G gNB 14 to establish a 5G connection between the UE and the 5G eNB 14 on that 5G carrier 18. And once the UE is connected with the 5G gNB 14, the UE could then transmit to the 5G eNB 14 an attach or registration request message, which the 5G gNB 14 could forward to the control-plane subsystem 34 of the 5G core network 22 for processing. And upon authenticating and authorizing the UE for service, the control-plane subsystem 34 and the 5G gNB 14 could coordinate setup for the UE of at least one user-plane bearer through the user-plane subsystem 32 of the 5G core network 22, likewise enabling the UE to communicate on transport network 24.

Once the UE is connected with the 5G gNB 14 and registered with the 5G core network 22, the 5G gNB 14 could then similarly provide the UE with wireless packet-data communications as noted above. For instance, when the user-plane subsystem 32 of the 5G core network 22 receives data from the transport network 24 for transmission to the UE, that data could flow via the UE's bearer to the 5G gNB 14, and the 5G gNB 14 could coordinate transmission of that data from the 5G gNB 14 to the UE on downlink PRBs of the 5G carrier 18 of the UE's 5G connection. And when the UE has data for transmission on the transport network 24, the UE could transmit a scheduling request to the 5G gNB 14, the 5G gNB 14 could coordinate transmission of that data from the UE to the 5G gNB 14 on uplink PRBs of the 5G carrier 18, and the data could then flow via the UE's access bearer through the user-plane subsystem 32 of the 5G core network 20, for output on the transport network 24.

In relation to the attachment process, as to 4G or 5G service, the UE's serving access node may also obtain capabilities data regarding the UE. For instance, the user-plane subsystem of the associated core network may obtain a set of capabilities data for the UE from a central server, registry, or directory, and may provide that capabilities data to the access node. Alternatively or additionally, the UE may transmit such capabilities data to the access node. The access node may then store the capabilities data for reference when serving the UE. In an example implementation, this capabilities data could indicate which RATs the UE supports and whether the UE supports DSS, among other capabilities information.

In line with the discussion above, the 4G eNB 12 could be configured to dynamically reassign a portion of at least one 4G carrier 16 for use to define part or all of a 5G carrier 18 on which the 5G gNB 14 can operate. Further, the 4G eNB 12 select the portion to so reassign, with the selection being based on the level of noise on the portion compared with the level of noise respectively on each of one or more other portions of the 4G carrier. And still further, the 4G eNB 12 could determine what size portion to so reassign, with the determination being based on consideration of the level of load of the 5G gNB 14, such as selecting a larger portion to so reassign if the 5G gNB is more loaded for instance.

Without limitation, in an example implementation, the portion of the 4G carrier 16 that the 4G eNB 12 would dynamically reassign to the 5G gNB 14 could be a frequency-contiguous group of one or more PRBs selected (as a proper subset) from the carrier's bandwidth. This selected group of PRBs could thus define a selected narrowband frequency range from within the wider bandwidth of the 4G carrier 16. If the 4G carrier 16 is an FDD carrier, this could be done respectively for the downlink channel and the uplink channel. Whereas, if the 4G carrier 16 is a TDD carrier, this could be done generally encompassing both the downlink and the uplink. Further, the reassignment of this frequency range could be done on a per-subframe or other per-time basis, such as to take effect only in certain subframes per frame, among other possibilities.

Normally, this frequency range would be devoted as part of the 4G carrier 16. The dynamic reassignment, however, could effectively convert the frequency range instead into a 5G carrier 18 or part of a 5G carrier 18. Further, the 4G eNB 12 could carry out this dynamic reassignment periodically or in response to one or more other triggers, and each time the 4G eNB carries out the process, the 4G eNB 12 may assign a different frequency range, selected in accordance with the present disclosure.

In practice, the 4G eNB 12 could determine first how wide of a swath of frequency to dynamically reassign to the 5G gNB 14. As noted above, the 4G eNB 12 could make this determination based on consideration of load of the 5G gNB 14. To facilitate this, the 5G gNB 14 could periodically report over interface 38 to the 4G eNB 12 the level of load of the 5G gNB 14, such as the quantity of data served by the 5G gNB 14 per unit time and/or the quantity of UEs served by the 5G gNB 14, among other possible load metrics. The 5G gNB 14 may report this load data in various forms, representing a latest such load metric and/or statistical trend data representing typical load of the 5G gNB 14 for the current time of day, for instance. Further, the 4G eNB 12 could receive this data and may itself roll up the data to establish statistical trend data representing typical load of the 5G gNB 14 per time of day for instance.

Given the latest level of load of the 5G gNB 14 and/or predicting what the level of load of the 5G gNB 14 is likely to be for a current time of day based on past load data, the 4G eNB 12 could then determine a quantity Q of PRBs to include in a set of PRBs of 4G carrier 16 that the 4G eNB 12 will dynamically reassign to the 5G gNB 14. For instance, the 4G eNB 12 could determine a greater quantity Q of PRBs, defining a wider encompassing swath of RF spectrum to dynamically reassign, if and when the load of the 5G gNB 14 is higher, and the 4G eNB 12 could determine a lesser quantity Q of PRBs, defining a narrower encompassing swath of RF spectrum to dynamically reassign, if and when the load of the 5G gNB 14 is lower. To facilitate this, the 4G eNB 12 could be provisioned with mapping data (e.g., a table) that maps various ranges of load to associated quantities Q of PRBs, and the 4G eNB 12 could refer to that mapping data to determine a quantity Q of PRBs based on the level of load of the 5G gNB 14.

At issue for the 4G eNB 12 may then be which contiguous set of Q of the PRBs of carrier 16 the 4G eNB 12 should select to be dynamically reassigned to the 5G gNB 14.

As noted above, the 4G eNB 12 could make this selection based on a consideration of the level of noise respectively of each of various candidate sets of Q of the PRBs of the carrier 16. In an example implementation, for instance, the 4G eNB 12 could divide the PRBs of carrier 16 into mutually exclusive sets of Q PRBs, or the 4G eNB 12 could otherwise define candidate sets of Q PRBs of the carrier 16, possibly sets that are not mutually exclusive but that rather overlap with each other to some extent. And the 4G eNB 12 could evaluate the level of noise respectively on each such candidate set of PRBs.

The 4G eNB 12 could determine the level of noise respectively of each candidate set of PRBs in various ways, possibly considering noise per PRB on the downlink and/or noise per PRB on the uplink.

On the downlink, for instance, the 4G eNB 12 could determine the level of noise per downlink PRB by having one or more served UEs measure and report to the 4G eNB 12 a level of signal-to-interference-plus-noise ratio (SINR) of transmission (e.g., reference signal transmission or other transmission) from the 4G eNB 12 respectively per PRB on the carrier. For instance, the 4G eNB 12 could transmit to each such served UE an RRC connection reconfiguration message that directs the UE to take and report such measurements, and the UEs could responsively take such measurements and transmit RRC messages to the 4G eNB 12 providing the measurements. The 4G eNB 12 could then effectively deem the level of noise per PRB to be an inverse of such reported SINR for that PRB. And the 4G eNB 12 could maintain in data storage a rolled up average or other statistical measures of this or other such noise per PRB, such as over a recent sliding window of time for instance.

And on the uplink, the 4G eNB 12 could determine the level of noise per uplink PRB by itself measuring the level of noise per uplink PRB. For instance, the access node could measure the energy level above a baseline level on each PRB, as a representation of reverse noise rise (RNR) or the like (e.g., the level of energy that the 4G eNB 12 measures on useable resource elements of the PRB at times when no communication is scheduled on the resource elements), among other possibilities. And the 4G eNB 12 could likewise maintain in data storage a rolled up average or other statistical measure of this or other such noise per PRB, also perhaps over a recent sliding window of time.

Given this or other such data indicating the level of noise per PRB on the carrier, the 4G eNB 12 could then compute a level of noise respectively of each candidate set of Q of the PRBs. For instance, the 4G eNB 12 could compute the level of noise per candidate set of PRBs as the total of the level of noise of its constituent PRBs or as the average of the level of noise of its constituent PRBs, among other possibilities.

The 4G eNB 12 could then select one of the candidate sets of PRBs to be the set of PRBs defining the frequency portion of carrier 16 that the 4G eNB 12 will dynamically reassign to 5G gNB 14 for use to provide 5G service. As noted above, for instance, the 4G eNB 12 could select one of the candidate sets of PRBs based on the candidate set having the highest determined level of noise among the candidate sets of PRBs of the carrier 16, or the 4G eNB 12 could select one of the candidate sets of PRBs based on the candidate set having higher determined noise than at least one other of the candidate sets of PRBs of the carrier 16.

Once the 4G eNB 12 has selected this frequency portion of carrier 16 to dynamically reassign to the 5G gNB 14 for use to provide 5G service, the 4G eNB 12 could then engage in the dynamic reassignment. Dynamically reassigning this spectrum could occur in a standard manner. Without limitation, for instance, the 4G eNB 12 could engage in signaling with the 5G gNB 14 to inform the 5G gNB 14 of the assigned frequency portion as a 5G carrier 18 and to establish the time and frequency position on that carrier of the SSB that the 5G gNB 14 will broadcast to enable UEs to detect and connect on the carrier. Further, the 4G eNB 12 could broadcast in a SIB2 message, or unicast to its served UEs (perhaps specifically to UES selected by the 4G eNB 12 based on their capabilities data indicating that they support DSS), an indication of the 5G carrier 18 such as its SSB position, to enable the UEs to detect and connect on the carrier.

The 5G gNB 14 may then commence operation on the newly defined 5G carrier encompassing the frequency portion dynamically reassigned by the 4G eNB 12. Further, one or more UEs served by the 4G eNB 12 and/or privy to the SIB2 broadcast from the 4G eNB 12, among other possibilities, may then scan for and discover the SSB of the new carrier 18 and then work with the 5G gNB 14 to establish a 5G connection and to be served by the 5G gNB 14 on the new carrier 18.

Further, upon so dynamically reassigning the selected frequency portion to the 5G gNB 14, the 4G eNB 12 could then continue to provide 4G service on just a remainder of the 4G carrier 16. For instance, while before the reassignment the 4G eNB 12 may have allocated any of the various PRBs of the 4G carrier 16 for use to carry bearer communications between the 4G eNB 12 and its served UE(s), after the reassignment, the 4G eNB 12 may then allocate for such use any of the various PRBs other than those of the reassigned selected frequency portion, forgoing allocation of the reassigned PRBs for the time being.

In an example implementation, the 4G eNB 12 could carry out this dynamic spectrum reassignment process just when the 4G eNB 12 is serving at least one UE whose capability data indicates that the UE is DSS capable, or just when the 4G eNB 12 is serving at least some other predefined threshold number of UEs whose capability data indicates that they are each DSS capable. Thus, the 4G eNB 12 could regularly monitor capabilities data of its served UEs to so determine when to carry out this process and could carry out the process accordingly based on the extent to which the 4G eNB 12 is serving one or more DSS-capable UEs.

Further, as noted above, the dynamic reassignment of RF spectrum could be for use in just certain subframes. For instance, as to every 10-subframe frame on the 4G carrier 16, the 4G eNB 12 could dynamically reassign a frequency portion in just one or two of the subframes, leaving the more full RF spectrum available for 4G use in the other subframes. Other examples are possible as well.

Figure 2:
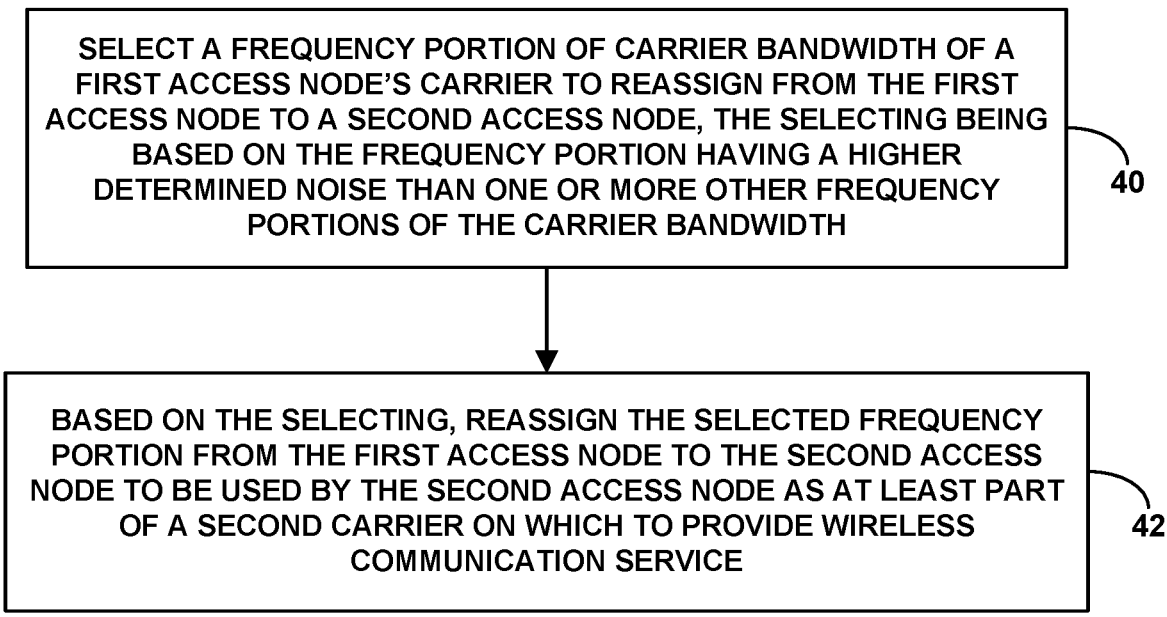
FIG. 2 is a flow chart depicting a method that can be carried out in accordance with the disclosure.

FIG. 2 is next a flow chart depicting a method that could be carried out in accordance with the present disclosure, to dynamically reassign RF spectrum from a first access node to a second access node in a scenario where the first access node provides wireless communication service on a first carrier that has a carrier bandwidth. As noted above, this method could be carried out by the first access node and/or by another computing system.

As shown in FIG. 2, at block 40, the method includes selecting a frequency portion of the carrier bandwidth to reassign from the first access node to the second access node, with the selecting being based on the frequency portion having a higher determined noise than one or more other frequency portions of the carrier bandwidth. And at block 42, the method includes, based on the selecting, reassigning the selected frequency portion from the first access node to the second access node to be used by the second access node as at least part of a second carrier on which to provide wireless communication service. Upon reassigning of the selected frequency portion, the second access node could then provide wireless communication service on the reassigned frequency portion, and the first access node could continue to provide wireless communication service on a remainder of the first carrier.

In line with the discussion above, the method could additionally involve determining a width of frequency to reassign from the first access node to the second access node, with the determining being based on a level of load of the second access node. And in that case, the selecting of the frequency portion of the carrier bandwidth could involve, based on the determining of the width of frequency to reassign, selecting as the frequency portion of the carrier bandwidth a frequency portion of the determined width. Without limitation, for instance, the carrier bandwidth could define a plurality of PRBs, and the act of determining the width of frequency could involve determining a quantity of the PRBs that could define the frequency portion.

As further discussed above, the act of selecting the frequency portion based on the frequency portion having a higher determined noise than one or more other frequency portions of the carrier bandwidth could involve selecting the frequency portion based on a determination that the frequency portion has a highest determined noise of a plurality of frequency portions of the carrier bandwidth.

Further, as discussed above, the act of selecting the frequency portion based on the frequency portion having a higher determined noise than one or more other frequency portions of the carrier bandwidth could be based on uplink noise, which could be based on RNR, and/or could be based on downlink noise, which could be based on SINR. In addition, as discussed above, the carrier bandwidth could define a plurality of PRBs, and the selected frequency portion could be defined as a frequency-contiguous proper subset of those PRBs. And in that case, the noise of the selected frequency portion could be determined based on noise of the PRBs encompassed by the selected frequency portion.

Still further, as discussed above, in an example implementation, the first access node could provide 4G LTE service on the first carrier, and the second access node could provide 5G NR service on the second carrier.

Figure 3:
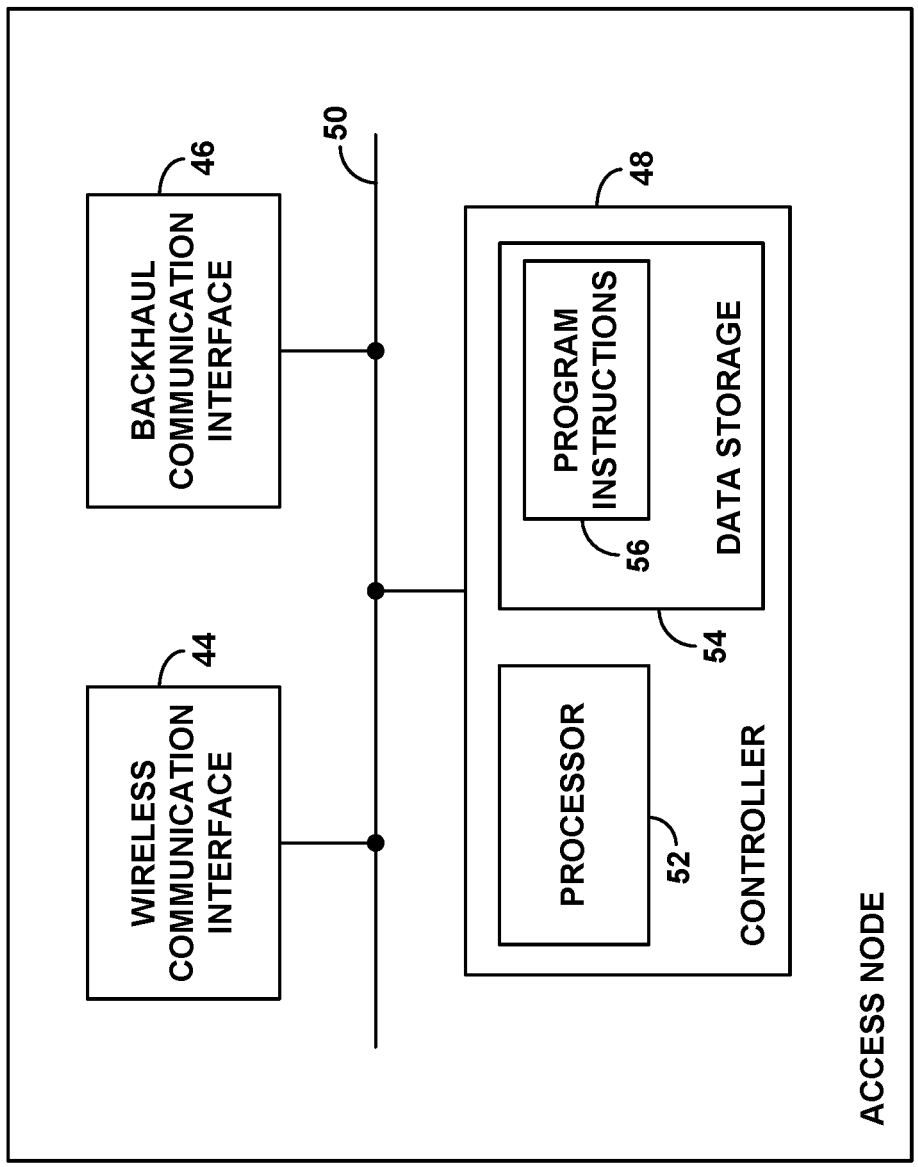
FIG. 3 is a simplified block diagram of an example access node operable in an example implementation.

FIG. 3 is next a simplified block diagram of an example first access node that could be configured to carry out various features described herein. As shown in FIG. 3, the example first access node includes a wireless communication interface 44, a backhaul communication interface 46, and a controller 48, all of which could be integrated together and/or communicatively linked together by a system bus, network, or other connection mechanism 50.

In an example implementation, the wireless communication interface 44 could support air-interface communication on a first carrier that has a carrier bandwidth, and the wireless communication interface could therefore comprise an antenna structure, which could be tower mounted or could take other forms, and associated components such as a power amplifier and a wireless transceiver, so as to enable the access node to serve UEs on such a carrier. And the backhaul communication interface 46 could comprise a wired or wireless communication module, such as an Ethernet network communication module and associated logic, through which the first access node could engage in backhaul communication with various other network entities including core-network entities and a second access node.

Further, the controller 48 could be configured to carry out various operations described herein, such as the operations described above in connection with FIG. 2, to dynamically reassign RF spectrum from the first access node to the second access node. For instance, as shown, the controller 48 could include at least one processor 52, such as one or more general purpose processors (e.g., microprocessors) and/or one or more specialized processors, and a non-transitory data storage 54 (e.g., one or more volatile and/or non-volatile storage components (e.g., magnetic, optical, or flash storage, necessarily non-transitory)) storing program instructions 56 executable by the at least one processor 52 to carry out those operations (e.g., to cause the first access node to carry out the operations).

Various other features described herein can be implemented in this context as well, and vice versa.

Figure 4:
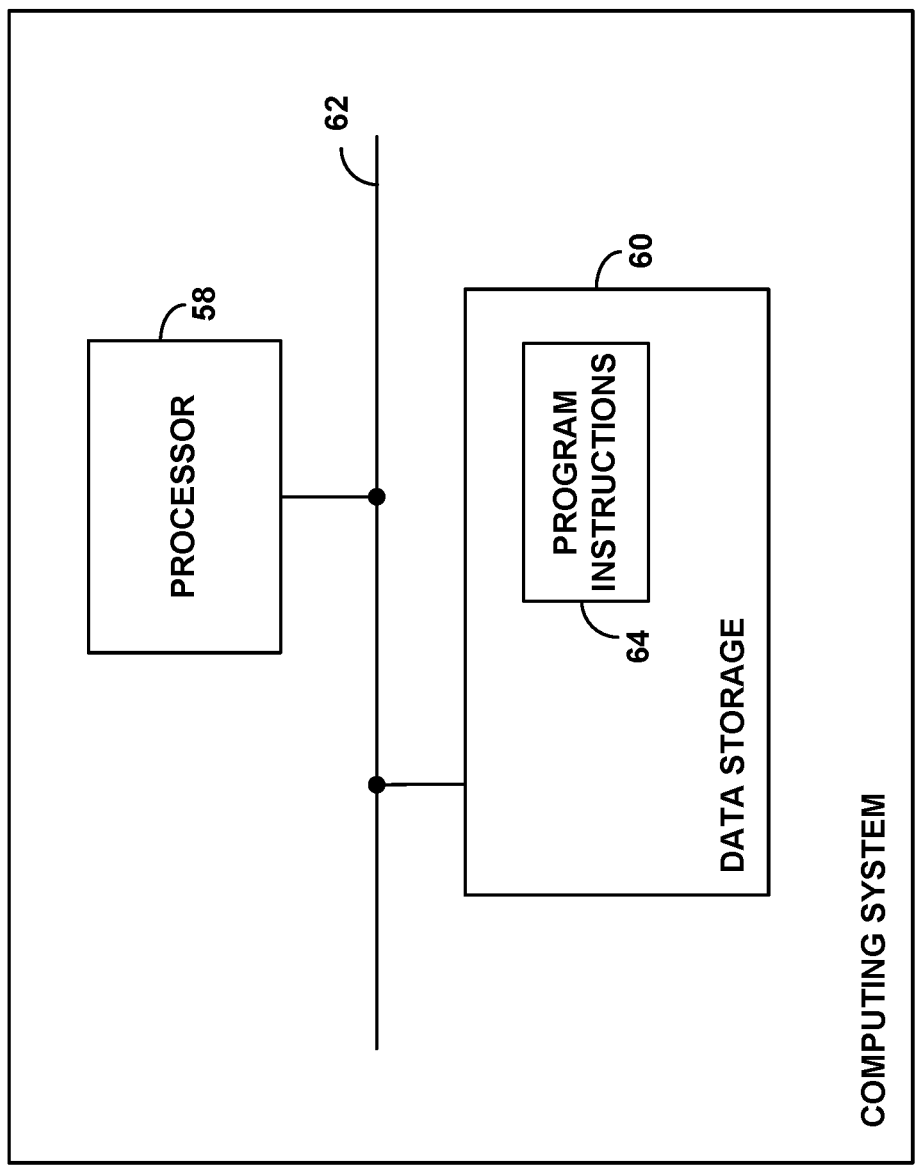
FIG. 4 is a simplified block diagram of an example computing system operable in an example implementation.

FIG. 4 is next a simplified block diagram of an example computing system that could carry out various features as described above. In the example arrangement discussed above, this computing system could be provided at various entities, such as the 4G eNB 12 or the like, or an element management system or other network entity, among other possibilities. As shown in FIG. 4, the computing system includes at least one processor 58 and at least one non-transitory data storage 60, which could be integrated or communicatively linked together by a system bus, network, or other connection mechanism 62.

The at least one processor 46 could comprise one or more general purpose processors and/or one or more specialized processors. And the at least one non-transitory data storage 60 could comprise one or more volatile and/or non-volatile storage components, such as magnetic, optical, or flash storage media (necessarily non-transitory). And as further shown, the at least one non-transitory data storage 60 storing program instructions 64. In a representative implementation, those program instructions 64 could be executable by the at least one processor 58 to carry out various operations described herein, such as the operations described above in connection with FIG. 2 for instance.

Various other features discussed herein can be implemented in this context as well, and vice versa.

The present disclosure also contemplates at least one non-transitory computer readable medium (e.g., one or more magnetic, optical, of flash storage components, necessarily non-transitory) having stored thereon (e.g., being encoded with) or otherwise containing program instructions executable by a processor to carry out various operations as described herein.

Exemplary embodiments have been described above. Those skilled in the art will understand, however, that changes and modifications may be made to these embodiments without departing from the true scope and spirit of the invention.

What is claimed is:

1. A method to dynamically reassign radio frequency (RF) spectrum from a first access node to a second access node, wherein the first access node provides wireless communication service on a first carrier having a carrier bandwidth, the method comprising:
    determining a width of frequency to reassign from the first access node to the second access node, wherein the carrier bandwidth defines a plurality of physical resource blocks (PRBs), and wherein the determining the width of frequency comprises determining a quantity of PRBs;
    selecting a frequency portion of the carrier bandwidth and of the determined width to reassign from the first access node to the second access node, wherein the selecting is based on determined noise on the frequency portion compared with determined noise respectively on each of one or more other frequency portions of the carrier bandwidth, wherein selecting the frequency portion based on the determined noise on the frequency portion compared with the determined noise respectively on each of the one or more other frequency portions of the carrier bandwidth is based on at least one of uplink noise or downlink noise; and
    based on the selecting, reassigning the selected frequency portion from the first access node to the second access node to be used by the second access node as at least part of a second carrier on which to provide wireless communication service,
    whereby, upon the reassigning of the selected frequency portion, the first access node then continues to provide wireless communication service on a remainder of the first carrier.

2. The method of claim 1, wherein the method is carried out by the first access node.

3. The method of claim 1, wherein the determining the width of frequency is based on a level of load of the second access node.

4. The method of claim 1, wherein the uplink noise is based on reverse noise rise.

5. The method of claim 1, wherein the downlink noise is based on an inverse of signal-to-interference-plus-noise ratio (SINR).

6. The method of claim 1, wherein the selected frequency portion is defined as a frequency-contiguous proper subset of the PRBs, and wherein the noise of the selected frequency portion is determined based on noise of the PRBs encompassed by the selected frequency portion.

7. The method of claim 1, wherein the first access node provides 4G LTE service on the first carrier, and wherein the second access node provides 5G NR service on the second carrier.

8. A first access node comprising:
    a wireless communication interface supporting air-interface communication on a first carrier, wherein the first carrier has a carrier bandwidth;
    a backhaul communication interface; and
    a controller configured to carry out operations to dynamically reassign radio frequency (RF) spectrum from the first access node to a second access node, wherein the controller comprises at least one processor, non-transitory data storage, and program instructions stored in the non-transitory data storage and executable by the at least one processor to carry out the operations, and wherein the operations include:
    determining a width of frequency to reassign from the first access node to the second access node, wherein the carrier bandwidth defines a plurality of physical resource blocks (PRBs), and wherein the determining the width of frequency comprises determining a quantity of PRBs;
    selecting a frequency portion of the carrier bandwidth and of the determined width to reassign from the first access node to the second access node, wherein the selecting is based on determined noise on the frequency portion compared with determined noise respectively on each of one or more other frequency portions of the carrier bandwidth, wherein selecting the frequency portion based on the determined noise on the frequency portion compared with the determined noise respectively on each of the one or more other frequency portions of the carrier bandwidth is based on at least one of uplink noise or downlink noise, and
    based on the selecting, reassigning the selected frequency portion from the first access node to the second access node to be used by the second access node as at least part of a second carrier on which to provide wireless communication service,
    whereby, upon the reassigning of the selected frequency portion, the first access node then continues to provide wireless communication service on a remainder of the first carrier.

9. The first access node of claim 8, wherein the determining the width of frequency is based on a level of load of the second access node.

10. The first access node of claim 8, wherein the uplink noise is based on reverse noise rise.

11. The first access node of claim 8, wherein the downlink noise is based on an inverse of signal-to-interference-plus-noise ratio (SINR).

12. The first access node of claim 8, wherein the selected frequency portion is defined as a frequency-contiguous proper subset of the PRBs, and wherein the noise of the selected frequency portion is determined based on noise of the PRBs encompassed by the selected frequency portion.

13. The first access node of claim 9, wherein the first access node provides 4G LTE service on the first carrier, and wherein the second access node provides 5G NR service on the second carrier.

14. A computing system configured to dynamically reassign radio frequency (RF) spectrum from a first access node to a second access node, wherein the first access node provides wireless communication service on a first carrier having a carrier bandwidth, the computing system comprising:
- at least one processor;
- at least one non-transitory data storage; and
- program instructions stored in the at least one non-transitory data storage and executable by the at least one processor to carry out operations including (i) determining a width of frequency to reassign from the first access node to the second access node, wherein the carrier bandwidth defines a plurality of physical resource blocks (PRBs), and wherein the determining the width of frequency comprises determining a quantity of PRBs, (ii) selecting a frequency portion of the carrier bandwidth and of the determined width to reassign from the first access node to the second access node, wherein the selecting is based on determined noise on the frequency portion compared with determined noise respectively on each of one or more other frequency portions of the carrier bandwidth, wherein selecting the frequency portion based on the determined noise on the frequency portion compared with the determined noise respectively on each of the one or more other frequency portions of the carrier bandwidth is based on at least one of uplink noise or downlink noise, and (iii) based on the selecting, reassigning the selected frequency portion from the first access node to the second access node to be used by the second access node as at least part of a second carrier on which to provide wireless communication service.

15. The computing system of claim 14, wherein the determining the width of frequency is based on a level of load of the second access node.

16. The computing system of claim 14, wherein the uplink noise is based on reverse noise rise, and wherein the downlink noise is based on an inverse of signal-to-interference-plus-noise ratio (SINR).

17. The computing system of claim 14, wherein the selected frequency portion is defined as a frequency-contiguous proper subset of the PRBs, and wherein the noise of the selected frequency portion is determined based on noise of the PRBs encompassed by the selected frequency portion.

* * * * *